March 18, 1930.    W. A. BREMER    1,750,872
WATER MEASURING APPARATUS
Filed Nov. 21, 1927
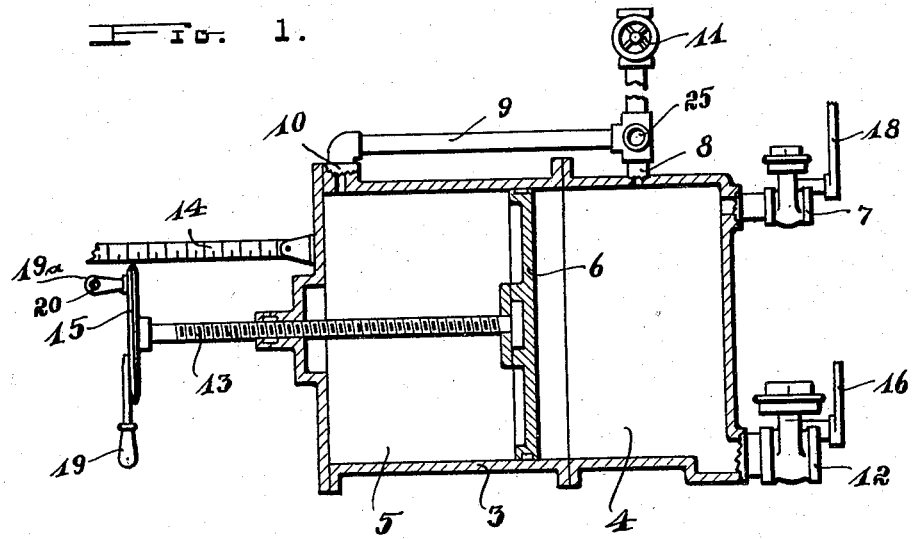
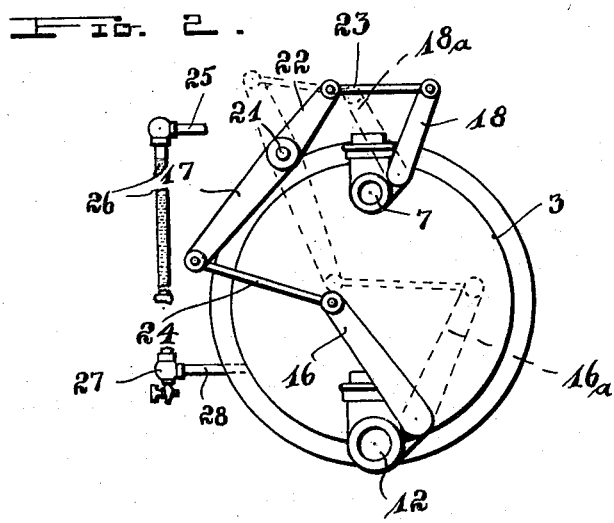
INVENTOR:
WILLIAM A. BREMER
By: Otto H. Kregh,
his Atty.

Patented Mar. 18, 1930

1,750,872

UNITED STATES PATENT OFFICE

WILLIAM A. BREMER, OF LOS ANGELES, CALIFORNIA

WATER-MEASURING APPARATUS

Application filed November 21, 1927. Serial No. 234,756.

This invention relates to devices used for measuring water to be added to concrete and the like mixtures.

One of the objects of this invention is to prevent any wrong mixing by providing a positive measuring mechanism.

Another object is to provide a device with visible indicating means whereby a proper mixing is assured.

Another object is to provide a measuring apparatus with a refilling mechanism to maintain a certain amount of liquids ready for any desired mixing.

Another object is to provide adjusting means for quickly and accurately setting the apparatus to measure any desired amount of liquids.

Another object is to provide an apparatus that can be set and adjusted during the operation for any amount of liquids desired in any mixture.

Other objects will appear from the following description and appended claims as well as from the accompanying drawing, in which—

Fig. 1 is a fragmentary longitudinal midsectional view of a measuring apparatus having an adjustable partition whereby a suitable amount of liquids can be held ready for a required mixing according to this invention.

Fig. 2 is an end elevation illustrating the controls for the measuring apparatus.

In mixing concrete it has been found that it is not alone of importance to proportion the cement in relation to other ingredients, such as sand and rock, but that it is very essential to maintain a certain relation between the water and the cement, since a proportioning between the water on the one side and the cement mixture on the other side has a great influence on the strength of concrete as has been clearly shown by tests.

It is therefore one of the principal features of this invention to provide an apparatus by which a certain amount of water can be held in readiness to be added to a cement mixture or similar composition.

As illustrated, the cylinder 3 is divided into two compartments 4 and 5 by an adjustable piston 6.

The water supply connection 7 allows a filling of the compartment 4 and, through the connection 8 and the communicating pipe 9, a filling of the compartment 5 by way of the connection 10.

The connections 8 and 10 together with the communicating pipe 9 are otherwise principally used for air vents.

A valve 11 is provided on the outer termination of this air vent for checking the passage through this outlet.

Any water accumulated in the compartment 4 may be drawn off through the outlet 12.

The plunger 6 is adjustable by the spindle 13. A scale 14 is provided by which the position of the hand wheel 15 can be set so as to indicate thereby the position of the piston 6. The spindle with the hand wheel may be locked to the scale or other place so that the piston can be held in a certain position from which it may only be removed by any person that is authorized to change the amount of water supply in order to prevent the common laborer on a job from tampering with this apparatus.

The piston 6 can in this manner be set more or less towards the right or left end of the apparatus or in relation to the outlet connection 12, so as to provide a smaller or larger volume of water in the compartment 4.

On opening the outlet 12 water is only drawn from the compartment 4, but the piston may be moved at any time to discharge the water from the compartment 5 through the communicating pipe 9 into the compartment 4 and therefrom through the outlet 12.

The inlet and outlet connections 7 and 12 are preferably operated in the order illustrated in Fig. 2 by a lever mechanism that assures a closing of one connection when the other is opened, as, for instance, if the outlet connection 12 is closed by a lever movement in the position indicated at 16, the main control lever 17 by its operative connection with the lever 18 automatically opens the valve 7. In the reversed order, if the valve 12 is opened by bringing the lever 16 over to the position indicated in dotted lines at 16ₐ, the whole lever mechanism is moved so as to bring the lever 18 to the position indicated in dotted lines at 18ₐ, and the valve 7 is closed at this moment while the valve 12 is opened.

The connecting rod 23 connects the lever end 22 with the lever 18, and the connecting rod or link 24 connects the main lever 17 with the lever 16. The main lever 17 is mounted to swing around the pin 21.

Handles 19 and 19ₐ are indicated in Fig. 1 in different positions, but it must be understood that no particular design is intended by this showing. Any sort of handle may be provided on the hand wheel 15 by which the spindle can be conveniently operated. The perforation 20 on the handle 19ₐ is merely indicated to support the above argument that the hand wheel 15 may be locked to the scale, even though I do not mean to specify this particular setting and locking of the hand wheel to the scale, but merely wish to indicate that the hand wheel may be locked in a certain position in relation to the scale. A similar perforation may be provided on the handle 19 and this handle may easily be locked to the cylinder or any other suitable place, depending on the mounting of the cylinder on some convenient base and depending on other surroundings or local structures on which this device may be used.

I therefore do not limit myself to any specific details shown in the drawing, but it should be understood that variations may be made to suit conditions and requirements of different localities and cooperating structures.

The side connection 25 serves to support the upper end of the glass 26 of a water gage of which the lower end 27 communicates with the side of the cylinder 3 through the connection 28. By this water gage the level of water in the cylinder is visibly indicated to avoid a drawing of water from the compartment 4 before a refilling has been completed to assure the supply of a proper amount of water desired in mixtures.

Having thus described my invention, I claim:

1. In a water supply and measuring apparatus, a cylinder having inlet and outlet connections at one end, a piston movable longitudinally within and dividing the cylinder into measuring and storing compartments, communicating means between said compartments, a spindle mounted in the cylinder and having operative engagement therewith whereby the spindle can be adjusted longitudinally within the cylinder, the spindle having also turnable engagement with the piston for moving the piston, the measuring compartment being on the side of the piston facing the end of the cylinder that has the inlet and outlet connections, whereby the volume of water admitted through the inlet connection into the measuring compartment comprises the measured volume to be discharged through the outlet connection, and a scale in operative relation to the spindle whereby the position of the piston is indicated on the outside of the cylinder.

2. In a water supply and measuring apparatus, a cylinder having inlet and outlet connections, a piston movable longitudinally within the cylinder and adapted to form measuring and storing compartments on its opposite sides, a spindle mounted in the cylinder and having operative engagement therewith whereby the spindle can be adjusted longitudinally within the cylinder, the spindle having also turnable engagement with the piston for moving the piston, a scale in operative relation to the spindle whereby the position of the piston is indicated on the outside of the cylinder, and an air vent embodying a communication between the measuring and storing compartments in the cylinder on the opposite sides of the piston whereby the volume of water admitted through the inlet connection into the measuring compartment comprises the measured volume to be discharged through the outlet connection, and adapted to facilitate an increase of the volume during the discharging operation by a shifting of the piston towards the storing compartment so as to supply water from the storing compartment through the communication into the measuring compartment determinable by the position of the spindle in relation to the scale.

3. In a water supply apparatus, a cylinder having inlet and outlet connections, a piston movable within the cylinder in a certain relation to the outlet connection forming storing and measuring compartments in the cylinder, and an air vent forming a communication between the compartments whereby a free flow is assured from one end of the cylinder and adapted to allow a supplying of additional water from the storing compartment to and through the measuring compartment.

4. In a water supply apparatus, a cylinder having inlet and outlet connections, a piston movable within the cylinder forming measuring and storing compartments, communicating means between said compartments, a spindle turnably connected to the piston and adjustably mounted in the cylinder, and a scale in operative relation to the outside end of said spindle, all adapted to facilitate a changing of the measuring volume during an operation.

In testimony that I claim the foregoing as my invention I have signed my name.

WILLIAM A. BREMER.